US007065609B2

(12) United States Patent
Eatherton et al.

(10) Patent No.: US 7,065,609 B2
(45) Date of Patent: Jun. 20, 2006

(54) PERFORMING LOOKUP OPERATIONS USING ASSOCIATIVE MEMORIES OPTIONALLY INCLUDING SELECTIVELY DETERMINING WHICH ASSOCIATIVE MEMORY BLOCKS TO USE IN IDENTIFYING A RESULT AND POSSIBLY PROPAGATING ERROR INDICATIONS

(75) Inventors: William N. Eatherton, San Jose, CA (US); Jaushin Lee, Saratoga, CA (US); Bangalore L. Priyadarshan, Fremont, CA (US); Priyank Ramesh Warkhede, San Jose, CA (US); Fusun Ertemalp, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 298 days.

(21) Appl. No.: 10/215,700

(22) Filed: Aug. 10, 2002

(65) Prior Publication Data

US 2004/0030802 A1 Feb. 12, 2004

(51) Int. Cl.
*G06F 12/00* (2006.01)
(52) U.S. Cl. ........................................ 711/108; 365/49
(58) Field of Classification Search ................ 711/105, 711/125, 143, 158, 205–208, 108, 212; 709/238, 709/245; 370/401–402, 453
See application file for complete search history.

(56) References Cited

U.S. PATENT DOCUMENTS

| 3,648,254 A | 3/1972 | Beausoleil |
| 4,296,475 A | 10/1981 | Nederlof et al. |
| 4,791,606 A | 12/1988 | Threewitt et al. |
| 4,996,666 A | 2/1991 | Duluk, Jr. |
| 5,088,032 A | 2/1992 | Bosack |
| 5,291,491 A * | 3/1994 | Hutchison et al. .......... 370/453 |
| 5,319,763 A | 6/1994 | Ho et al. |
| 5,339,076 A | 8/1994 | Jiang |
| 5,383,146 A | 1/1995 | Threewitt |
| 5,404,482 A | 4/1995 | Stamm et al. |
| 5,428,565 A | 6/1995 | Shaw |
| 5,440,715 A | 8/1995 | Wyland |
| 5,450,351 A | 9/1995 | Heddes |
| 5,481,540 A | 1/1996 | Huang |
| 5,515,370 A | 5/1996 | Rau |

(Continued)

OTHER PUBLICATIONS

AN-N15, Sep. 30, 1998, Music Semiconductor.*

(Continued)

*Primary Examiner*—Donald Sparks
*Assistant Examiner*—Hashem Farrokh
(74) *Attorney, Agent, or Firm*—The Law Offices of Kirk D. Williams

(57) ABSTRACT

Methods and apparatus are disclosed for performing lookup operations using associative memories, including, but not limited to modifying search keys within an associative memory based on modification mappings, forcing a no hit condition in response to a highest priority matching entry including a force no hit indication, selecting among various blocks or sets of associative memory entries in determining a lookup result, and detecting and propagating error conditions. In one implementation, indications of which associative memory blocks to use and/or enable in a particular lookup operation are retrieved from one or more memories, such as that based on received a profile ID. In one implementation, which may or may not be in a cascaded configuration, one or more identified or received error conditions are propagated in such a manner as to identify a source of each error condition.

38 Claims, 15 Drawing Sheets

U.S. PATENT DOCUMENTS

| | | | |
|---|---|---|---|
| 5,684,954 A | 11/1997 | Kaiserswerth et al. | |
| 5,740,171 A | 4/1998 | Mazzola et al. | |
| 5,748,905 A * | 5/1998 | Hauser et al. | 709/249 |
| 5,802,567 A | 9/1998 | Liu et al. | |
| 5,841,874 A | 11/1998 | Kempke et al. | |
| 5,842,040 A | 11/1998 | Hughes et al. | |
| 5,852,569 A | 12/1998 | Srinivasan et al. | |
| 5,898,689 A | 4/1999 | Kumar et al. | |
| 5,920,886 A | 7/1999 | Feldmeier | |
| 5,930,359 A | 7/1999 | Kempke et al. | |
| 5,956,336 A | 9/1999 | Loschke et al. | |
| 5,978,885 A | 11/1999 | Clark, II | |
| 6,000,008 A | 12/1999 | Simcoe | |
| 6,041,389 A | 3/2000 | Rao | |
| 6,047,369 A | 4/2000 | Colwell et al. | |
| 6,061,368 A | 5/2000 | Hitzelberger | |
| 6,069,573 A | 5/2000 | Clark, II et al. | |
| 6,081,440 A | 6/2000 | Washburn et al. | |
| 6,091,725 A | 7/2000 | Cheriton et al. | |
| 6,097,724 A | 8/2000 | Kartalopoulos | |
| 6,134,135 A | 10/2000 | Andersson | |
| 6,137,707 A | 10/2000 | Srinivasan et al. | |
| 6,141,738 A | 10/2000 | Munter et al. | |
| 6,148,364 A | 11/2000 | Srinivasan et al. | |
| 6,154,384 A | 11/2000 | Nataraj et al. | |
| 6,175,513 B1 | 1/2001 | Khanna | |
| 6,181,698 B1 | 1/2001 | Hariguchi | |
| 6,199,140 B1 | 3/2001 | Srinivasan et al. | |
| 6,219,748 B1 | 4/2001 | Srinivasan et al. | |
| 6,236,658 B1 | 5/2001 | Essbaum et al. | |
| 6,237,061 B1 | 5/2001 | Srinivasan et al. | |
| 6,240,003 B1 | 5/2001 | McElroy | |
| 6,240,485 B1 | 5/2001 | Srinivasan et al. | |
| 6,243,667 B1 | 6/2001 | Kerr et al. | |
| 6,246,601 B1 | 6/2001 | Pereira | |
| 6,285,378 B1 | 9/2001 | Duluk, Jr. | |
| 6,289,414 B1 | 9/2001 | Feldmeier et al. | |
| 6,295,576 B1 | 9/2001 | Ogura et al. | |
| 6,307,855 B1 | 10/2001 | Hariguchi | |
| 6,308,219 B1 | 10/2001 | Hughes | |
| 6,374,326 B1 * | 4/2002 | Kansal et al. | 711/108 |
| 6,377,577 B1 | 4/2002 | Bechtolsheim et al. | |
| 6,389,506 B1 | 5/2002 | Ross et al. | |
| 6,430,190 B1 | 8/2002 | Essbaum et al. | |
| 6,434,662 B1 | 8/2002 | Greene et al. | |
| 6,526,474 B1 | 2/2003 | Ross | |
| 6,535,951 B1 | 3/2003 | Ross | |
| 6,763,426 B1 * | 7/2004 | James et al. | 711/108 |
| 2002/0075714 A1 * | 6/2002 | Pereira et al. | 365/49 |
| 2003/0005146 A1 * | 1/2003 | Miller et al. | 709/238 |
| 2004/0015752 A1 * | 1/2004 | Patella et al. | 714/718 |

OTHER PUBLICATIONS

Jon P. Wade and Charles G. Sodini, "A Ternary Content Addressable Search Engine," IEEE Journal of Solid-State Circuits, vol. 24, No. 4, Aug. 1989, pp. 1003-1013.

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"What is a CAM (Content-Addressable Memory)?," Application Brief AB-N6, Rev. 2a, Music Semiconductors, Milpitas, CA, Sep. 30, 1998, 4 pages.

"Reading Out the Valid LANCAM Memory Entries," Application Brief AB-N4, Rev. 1a, Music Semiconductors, Milpitas, CA, Sep. 30, 1998 4 pages.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using MUSIC Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

Tong-Bi Pei and Charles Zukowski, "VLSI Implementation of Routing Tables: Tries and CAMS," Networking in the Nineties, Proceedings of the Annual Joint Conference of the Computer and Communications Societies, New York, Apr. 7, 1991, pp. 515-524, vol. 2, Conf. 10.

Anthony Mcauley and Paul Francis, "Fast Routing Table Lookup Using CAMs," Networking Foundation for the Future, Proceedings of the Annual Joint Conference of the Computer and Communications Societies, Los Alamitos, Mar. 28, 1993, pp. 1382-1391, vol. 2, Conf 12.

U.S. Appl. No. 09/974,296, filed Oct. 4, 2001, Oren et al.

U.S. Appl. No. 10/215,719, filed Aug. 10, 2002, Eatherton et al.

* cited by examiner

PERFORMING LOOKUP OPERATIONS USING ASSOCIATIVE MEMORIES OPTIONALLY INCLUDING SELECTIVELY DETERMINING WHICH ASSOCIATIVE MEMORY BLOCKS TO USE IN IDENTIFYING A RESULT AND POSSIBLY PROPAGATING ERROR INDICATIONS

FIELD OF THE INVENTION

This invention especially relates to computer and communications systems, especially network routers and switches; and more particularly, the invention relates to methods and apparatus for performing lookup operations using associative memories, including, but not limited to binary and ternary content-addressable memories, the lookup operation possibly including selectively determining which associative memory blocks to use in identifying a result and possibly propagating error indications.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match.

Known approaches of packet classification include using custom application-specific integrated circuits (ASICs), custom circuitry, software or firmware controlled processors, and associative memories, including, but not limited to binary content-addressable memories (binary CAMs) and ternary content-addressable memories (ternary CAMs or TCAMs). Each entry of a binary CAM typically includes a value for matching against, while each TCAM entry typically includes a value and a mask. The associative memory compares a lookup word against all of the entries in parallel, and typically generates an indication of the highest priority entry that matches the lookup word. An entry matches the lookup word in a binary CAM if the lookup word and the entry value are identical, while an entry matches the lookup word in a TCAM if the lookup word and the entry value are identical in the bits that are not indicated by the mask as being irrelevant to the comparison operations.

Associative memories are very useful in performing packet classification operations. In performing a packet classification, it is not uncommon for multiple lookup operations to be performed in parallel or in series using multiple associative memories basically based on a same search key or variant thereof, as one lookup operation might be related to packet forwarding while another related to quality of service determination. Desired are new functionality, features, and mechanisms in associative memories to support packet classification and other applications.

Additionally, as with most any system, errors can occur. For example, array parity errors can occur in certain content-addressable memories as a result of failure-in-time errors which are typical of semiconductor devices. Additionally, communications and other errors can occur. Prior systems are known to detect certain errors and to signal that some error condition has occurred, but are typically lacking in providing enough information to identify and isolate the error. Desired is new functionality for performing error detection and identification.

SUMMARY OF THE INVENTION

Methods and apparatus are disclosed for performing lookup operations using associative memories. In one embodiment, a search key is received and a modification mapping is identified. The search key is modified based on the modification mapping to generate a lookup word. A lookup operation is performed based on the lookup word on multiple associative memory entries. In one embodiment, a profile ID is received and the modification mapping is identified based on the profile ID, such as by retrieving the modification mapping from a memory. In one embodiment, modification data is also received, and the search key is modified by replacing one or more bits or bytes in the search key with data from said modification data based on the modification mapping.

In one embodiment, each of the associative memory entries includes a first field including a value for use in a matching operation on a lookup word and a second field including data for indicating that a successful match on the entry should or should not force a no-hit result. In one embodiment, when a lookup operation is performed and a particular entry including an indication to force a no-hit is identified as a highest-priority matching entry for a set (e.g., one or more entries, an associative memory block, associative memory, etc.) of associative memory entries, the result or intermediate result of the lookup operation for that set is interpreted as a no-hit result (i.e., rather than a successful hit or match on the particular entry) based on the particular entry being identified to a force no-hit condition.

In one embodiment, an indication of a subset of associative memory entries to select among in determining an ultimate lookup result is retrieved from a memory, typically for each output of the associative memory. In one embodiment, indications of identified error conditions are propagated through one or more downstream cascaded associative memories.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
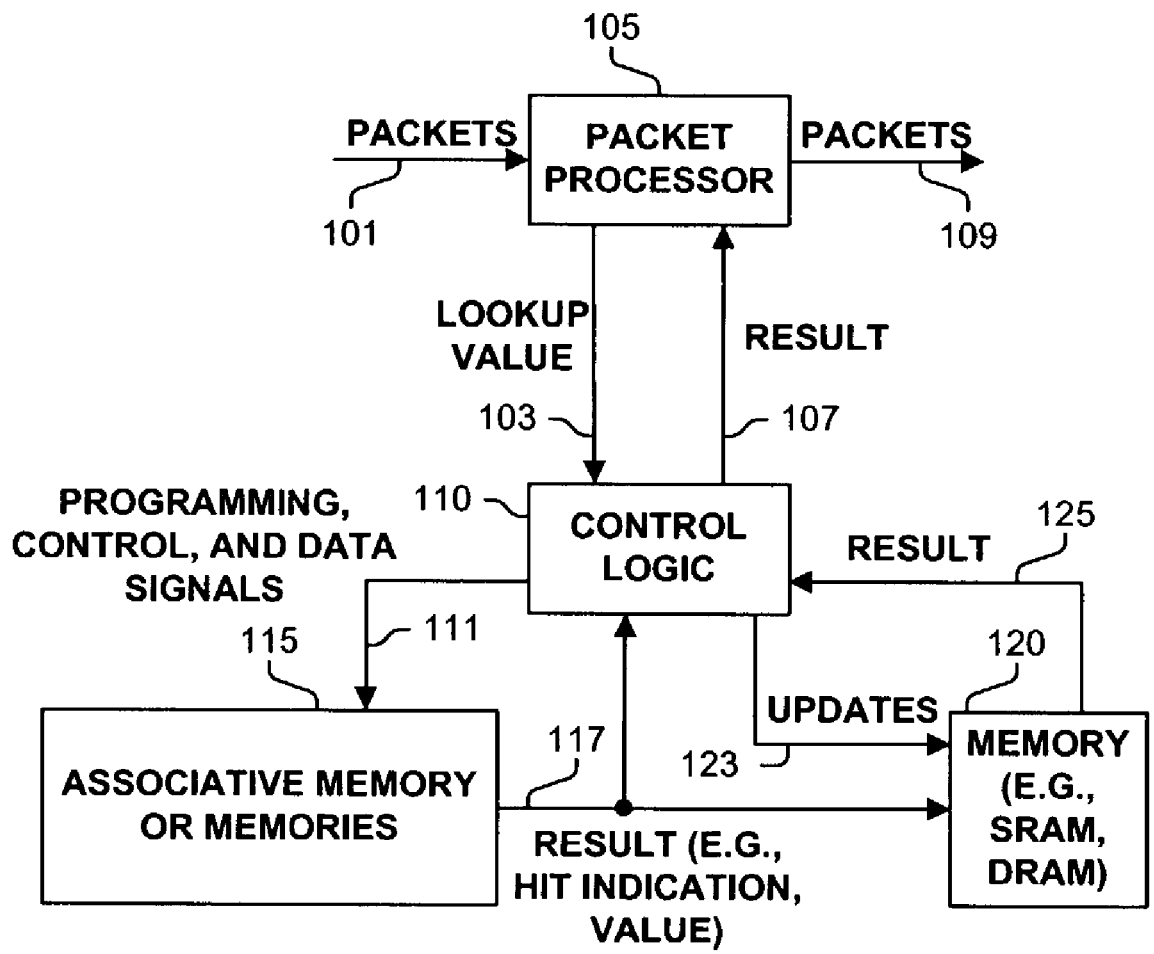
FIGS. 1A–E are block diagrams of various exemplary systems including one or more embodiments for performing lookup operations using associative memories.

Methods and apparatus are disclosed for performing lookup operations using associative memories, including, but not limited to modifying search keys within an associative memory based on modification mappings, forcing a no-hit condition in response to a highest-priority matching entry including a force no-hit indication, selecting among various associative memory blocks or sets or banks of associative memory entries in determining a lookup result, and detecting and propagating error conditions. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet, and which may or may not include modifying and/or forwarding the packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" refers to all types of known or future developed associative memories, including, but not limited to binary and ternary content-addressable memories, hash tables, TRIE and other data structures, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all or less than all of the elements of a set. Moreover, the term "or" is used herein to identify an alternative selection of one or more, including all, of the conjunctive items.

Methods and apparatus are disclosed for performing lookup operations using associative memories, including, but not limited to modifying search keys within an associative memory based on modification mappings, forcing a no-hit condition in response to a highest-priority matching entry including a force no-hit indication, selecting among various associative memory blocks or sets or banks of associative memory entries in determining a lookup result, and detecting and propagating error conditions. In one embodiment, each block retrieves a modification mapping from a local memory and modifies a received search key based on the mapping and received modification data. In one embodiment, each of the associative memory entries includes a field for indicating that a successful match on the entry should or should not force a no-hit result. In one embodiment, an indication of which associative memory sets or banks or entries to use in a particular lookup operation is retrieved from a memory.

One embodiment performs error detection and handling by identifying, handling and communication errors, which may include, but is not limited to array parity errors in associative memory entries and communications errors such as protocol errors and interface errors on input ports. Array parity errors can occur as a result of failure-in-time errors which are typical of semiconductor devices. One embodiment includes a mechanism to scan associative memory entries in background, and to identify any detected errors back to a control processor for re-writing or updating the flawed entry. In one embodiment, certain identified errors or received error conditions are of a fatal nature in which no processing should be performed. For example, in one embodiment, a fatal error causes an abort condition. In response, the device stops an in-progress lookup operation and just forwards error and possibly no-hit signals. Typically, these signals are generated at the time the in-progress lookup operation would have generated its result had it not been aborted so as to maintain timing among devices in a system including the associative memory.

In one embodiment, including cascaded or connected associative memory devices, error status messages indicating any error type and its corresponding source are propagated to indicate the error status to the next device and/or a control processor. In addition, the communicated signal may indicate and generate an abort condition in the receiving device. In one embodiment, the receiving device does not perform its next operation or the received instruction, or it may abort its current operation or instruction. Moreover, the receiving device may or may not delay a time amount corresponding to that which its processing would have required in performing or completing the operation or instruction so as to possibly maintain the timing of a transactional sequence of operations.

FIGS. 1A–E are block diagrams of various exemplary systems and configurations thereof, with these exemplary systems including one or more embodiments for performing lookup operations using associative memories. First, FIG. 1 illustrates one embodiment of a system, which may be part of a router or other communications or computer system, for performing lookup operations to produce results which can be used in the processing of packets. In one embodiment, control logic 110, via signals 111, programs and updates associative memory or memories 115, such as, but not limited to one or more associative memory devices, banks, and/or sets of associative memory entries which may or may not be part of the same associative memory device and/or bank. In one embodiment, control logic 110 also programs memory 120 via signals 123. In one embodiment, control logic 110 includes custom circuitry, such as, but not limited to discrete circuitry, ASICs, memory devices, processors, etc.

In one embodiment, packets 101 are received by packet processor 105. In addition to other operations (e.g., packet routing, security, etc.), packet processor 105 typically generates one or more items, including, but not limited to one or more packet flow identifiers based on one or more fields of one or more of the received packets 101 and possibly from information stored in data structures or acquired from other sources. Packet processor 105 typically generates a lookup value 103 which is provided to control logic 110 for providing control and data information (e.g., lookup words, modification data, profile IDs, etc.) to associative memory or memories 115, which perform lookup operations and generate one or more results 117. In one embodiment, a result 117 is used is by memory 120 to produce a result 125. Control logic 110 then relays result 107, based on result 117 and/or result 125, to packet processor 105. In response, one or more of the received packets are manipulated and forwarded by packet processor 105 as indicated by packets 109. Note, results 117, 125 and 107 may include indications of error conditions.

Figure 1B:
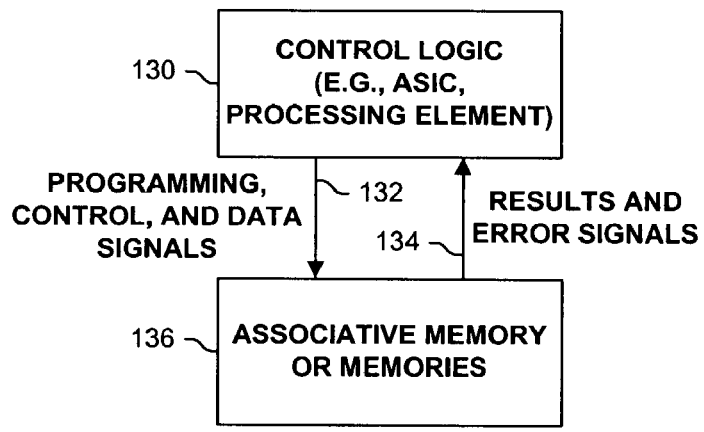

FIG. 1B illustrates one embodiment for performing lookup operations using associative memories, including, but not limited to modifying search keys within an associative memory based on modification mappings, forcing a no-hit condition in response to a highest-priority matching entry including a force no-hit indication, selecting among various associative memory blocks or sets or banks of associative memory entries in determining a lookup result, and detecting and propagating error conditions. Control logic 130, via signals 132, programs associative memory or memories 136. In addition, control logic 130 provides control and data information (e.g., lookup words, modification data, profile IDs, etc.) to associative memory or memories 136, which perform lookup operations to generate results and error signals 134, which are received by control logic 130.

Figure 1C:
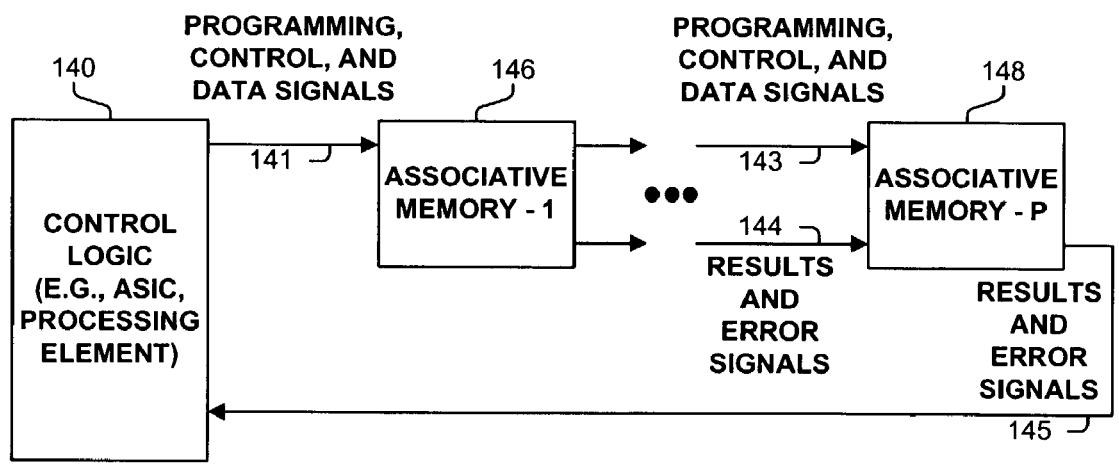

FIG. 1C illustrates one embodiment for performing lookup operations using associative memories, including, but not limited to modifying search keys within an associative memory based on modification mappings, forcing a no-hit condition in response to a highest-priority matching entry including a force no-hit indication, selecting among various associative memory blocks or sets or banks of associative memory entries in determining a lookup result, and detecting and propagating error conditions. Control logic 140, via signals 141–143, programs associative memories 146–148. In addition, control logic 140 provides control and data information (e.g., lookup words, modification data, profile IDs, etc.) to associative memories 146–148, which perform lookup operations to generate results and error signals 144–145. As shown each progressive stage forwards error messages to a next associative memory stage or to control logic 140. For example, associative memory 148 relays received error indications via signals 144 via signals 145 to control logic 140.

Moreover, in one embodiment, a synchronization bit field is included in messages 141–145 sent between devices 140 and 146–148, with the value being set or changed at predetermined periodic intervals such that each device 140, 146–148 expects the change. One embodiment uses a single synchronization bit, and if this bit is set in the request or input data 141–145 to a device 146–148, then the device 146–148 will set this bit in the corresponding reply or output data 143–145. For example, in one embodiment, control processor or logic 140 sets the sync bit in its request data 141 periodically, say once in every eight requests. Control processor or logic 140 also monitors the sync bit in the reply data 145. If any kind of error altered the request-reply association (or transaction timing) between the control processor or logic 140 and the associative memories 146–148, then control processor or logic 140 can detect it and recover from that error (by flushing the pipeline, etc.)

In this manner, devices, especially those as part of a transactional sequence, can synchronize themselves with each other. Resynchronization of devices may become important, for example, should an error condition occur, such as an undetected parity error in a communicated instruction signal (e.g., the number of parity errors exceed the error detection mechanism). There is a possibility that a parity error in an instruction goes undetected and that completely changes the transaction timing. Also, there could be other types of "unknown" errors that can put the control processor or logic and the associative memory chain out of synchronization.

Figure 1D:
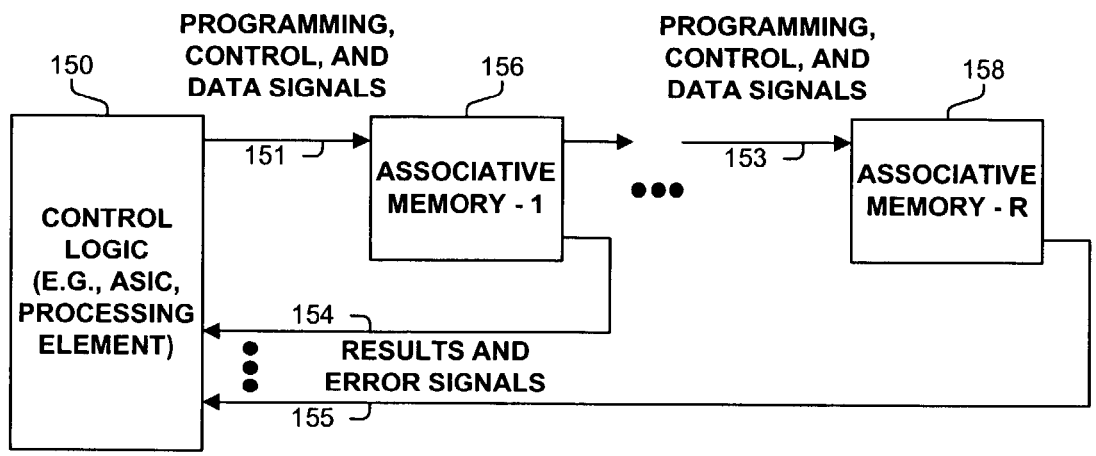

FIG. 1D illustrates one embodiment for performing lookup operations using associative memories, including, but not limited to modifying search keys within an associative memory based on modification mappings, forcing a no-hit condition in response to a highest-priority matching entry including a force no-hit indication, selecting among various associative memory blocks or sets or banks of associative memory entries in determining a lookup result, and detecting and propagating error conditions. Control logic 150, via signals 151–153, programs associative memories 156–158. In addition, control logic 150 provides control and data information (e.g., lookup words, modification data, profile IDs, etc.) to associative memories 156–158, which perform lookup operations to generate results and error signals 154–155 which are communicated to control logic 150.

Figure 1E:
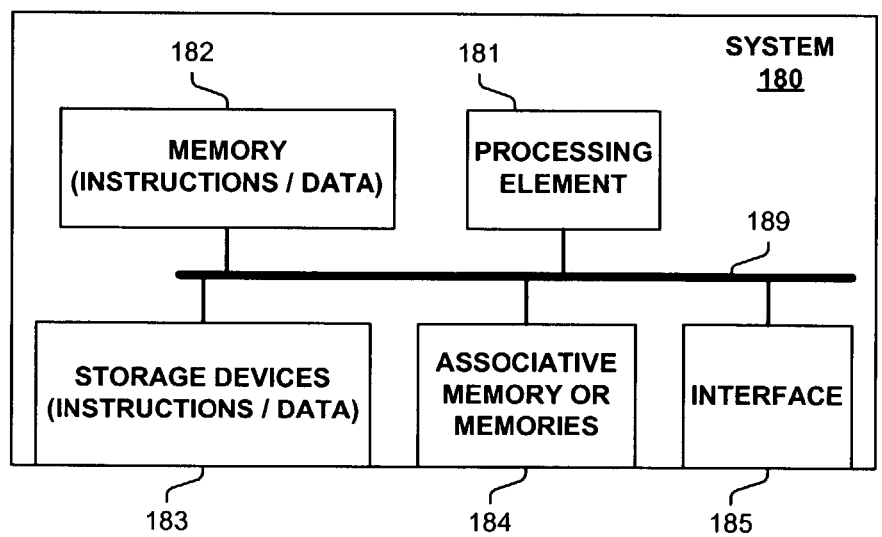

FIG. 1E illustrates a system 180, which may be part of a router or other communications or computer system, used in one embodiment for distributing entries among associative memory units and selectively enabling less than all of the associative memory units when performing a lookup operation. In one embodiment, system 180 includes a processing element 181, memory 182, storage devices 183, one or more associative memories 184, and an interface 185 for connecting to other devices, which are coupled via one or more communications mechanisms 189 (shown as a bus for illustrative purposes).

Various embodiments of system 180 may include more or less elements. The operation of system 180 is typically controlled by processing element 181 using memory 182 and storage devices 183 to perform one or more tasks or processes, such as programming and performing lookup operations using associative memory or memories 184. Memory 182 is one type of computer-readable medium, and typically comprises random access memory (RAM), read only memory (ROM), flash memory, integrated circuits, and/or other memory components. Memory 182 typically stores computer-executable instructions to be executed by processing element 181 and/or data which is manipulated by processing element 181 for implementing functionality in accordance with one embodiment of the invention. Storage devices 183 are another type of computer-readable medium, and typically comprise solid state storage media, disk drives, diskettes, networked services, tape drives, and other storage devices. Storage devices 183 typically store computer-executable instructions to be executed by processing element 181 and/or data which is manipulated by processing element 181 for implementing functionality in accordance with one embodiment of the invention.

In one embodiment, processing element 181 provides control and data information (e.g., lookup words, modification data, profile IDs, etc.) to associative memory or memories 184, which perform lookup operations to generate lookup results and possibly error indications, which are received and used by processing element 181 and/or communicated to other devices via interface 185.

Figure 2:
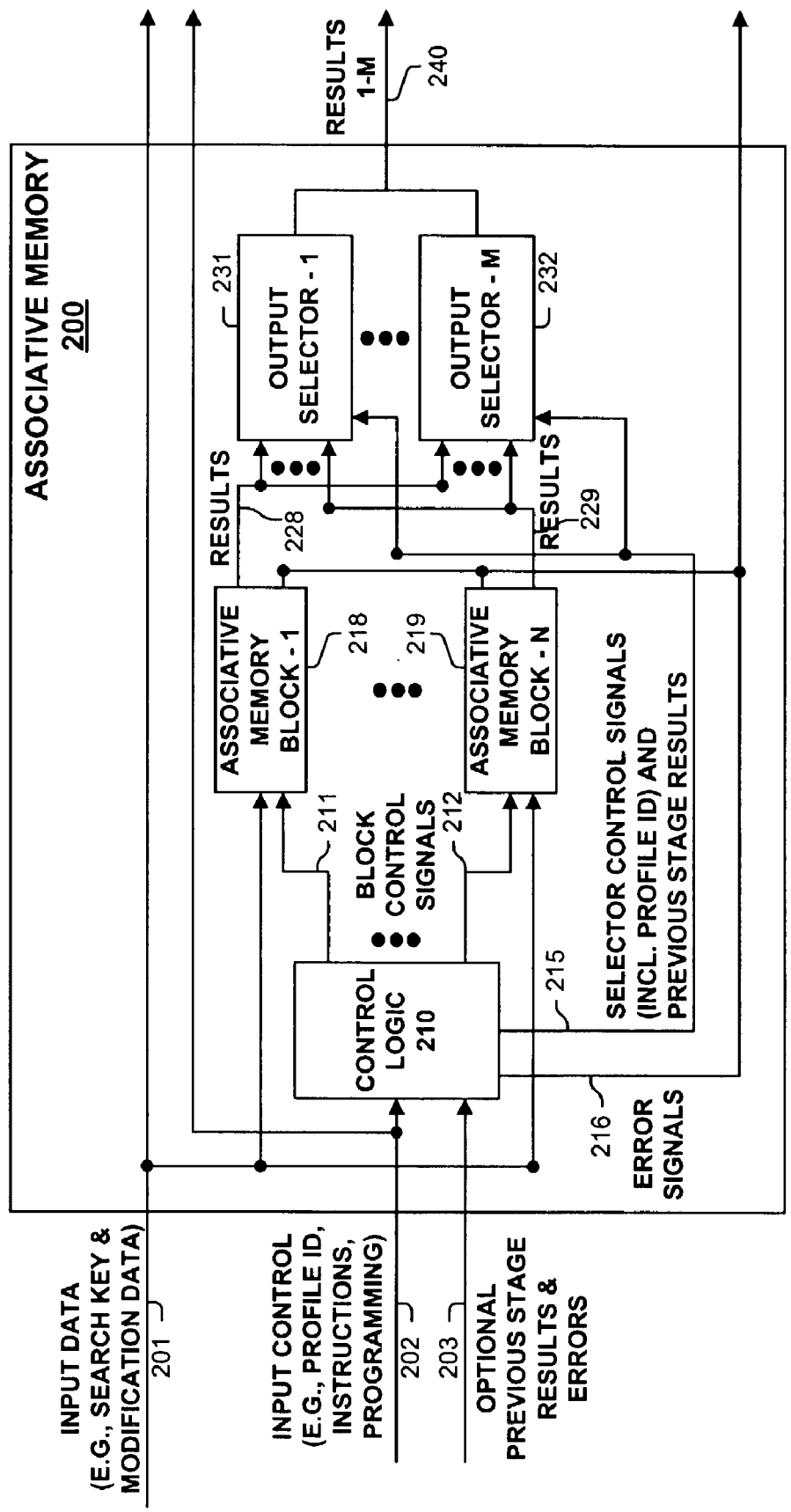
FIG. 2 is a block diagram of an associative memory including one or more embodiments for performing lookup operations.

FIG. 2 illustrates an associative memory 200 used in one embodiment for performing lookup operations using associative memories, including, but not limited to modifying search keys within an associative memory based on modification mappings, forcing a no-hit condition in response to a highest-priority matching entry including a force no-hit indication, selecting among various associative memory blocks or sets or banks of associative memory entries in determining a lookup result, and detecting and propagating error conditions. As shown, control logic 210 receives input control signals 202 which may include programming information. In turn, control logic 210 may update information and data structures within itself, program/update associative memory blocks 218–219, and/or output selectors 231–232. Note, in one embodiment, each of the associative memory blocks 218–219 include one or more associative memory sets or banks of associative memories entries, and logic or circuitry for performing lookup operations.

In one embodiment, input data 201, which may include, but is not limited to search keys and modification data, is received by associative memory 200 and distributed to associative memory blocks 218–219, and possibly forwarded to other downstream associative memories in a cascaded configuration. In addition, input control information 202, which may include, but is not limited to profile IDs (e.g., a value), instructions, programming information, is received by control logic 210, and possibly forwarded to other downstream associative memories in a cascaded configuration. In addition, in one embodiment, previous stage lookup results and/or error indications are received from previous stage associative memories in a cascaded configuration or from other devices by control logic 210. Note, in one embodiment, input data 201, input control 202, previous stage results and errors 203, and/or portions thereof are communicated directly to associative memory blocks 218–219 and/or output selectors 231–232.

Control logic 210 possibly processes and/or forwards the received information via block control signals 211–212 to associative memory blocks 218–219 and via selector control signals and previous stage results 215 (which typically includes the received profile ID) to output selectors 231–232. In addition, control logic 210 may generate error signals 216 based on a detected error in the received information or in response to received error condition indications. Note, in one embodiment, control logic 210 merely splits or regenerates a portion of or the entire received input control 202 and optional previous stage results and errors 203 signals as selector control signals and previous stage results signals 215 and/or error signals 216. In addition, control logic 210 could initiate an abort operation wherein a lookup operation will not occur because of a detected or received notification of an error condition.

In one embodiment, control logic 210 identifies data representing which associative memory blocks 218–219 to enable, which associative memory blocks 218–219 each output selector 231–232 should consider in determining its lookup result, and/or modification mappings each associative memory block 218–219 should use in modifying an input search key. In one embodiment, this data is retrieved, based on received input control information 202 (e.g., a profile ID or other indication), from one or more memories, data structures, and/or other storage mechanisms. This information is then communicated as appropriate to associative memory blocks 218–219 via block control signals 211–212, and/or output selectors 231–232 via selector control signals and previous stage results signals 215.

In one embodiment, associative memory blocks 218–219 each receive a search key and possibly modification data via signal 201, and possibly control information via block control signals 211–212. Each enabled associative memory block 218–219 then performs a lookup operation based on the received search key, which may include generating a lookup word by modifying certain portions of the search key based on received modification data and/or modification mappings. Each associative memory 218–219 typically generates a result 228–229 which are each communicated to each of the output selectors 231–232. In one embodiment, each associative memory block 218–219 that is not enabled generates a no-hit signal as its corresponding result 228–229. In one embodiment, output selectors 231–232 receive an indication of the associative memory blocks 218–219 that is not enabled.

Output selectors 231 evaluate associative memory results 228–229 to produce results 240. In one embodiment, each output selector has a corresponding identified static or dynamic subset of the associate memory results 228–229 to evaluate in determining results 240. In one embodiment, an identification of this corresponding subset is provided to each output selector 231–232 via selector control signals 215. In one embodiment, each of the output selectors 231–232 receives a profile ID via selector control signals 215 and performs a memory lookup operation based on the received profile ID to retrieve an indication of the particular associate memory results 228–229 to evaluate in determining results 240.

Moreover, in one embodiment, results 240 are exported over one or more output buses 240, each typically connected to a different set of one or more pins of a chip of the associative memory. In one embodiment, the number of output buses used and their connectivity to outputs selectors 231–232 are static, while in one embodiment the number of output buses used and their connectivity to outputs selectors 231–232 are configurable, for example, at initialization or on a per or multiple lookup basis. In one embodiment, an output bus indication is received by an output selector 231–232, which uses the output bus indication to determine which output bus or buses to use. For example, this determination could include, but is not limited to a direct interpretation of the received output bus indication, performing a memory read operation based on the received output bus indication, etc. In one embodiment, an output selector 231–232 performs a memory access operation based on a profile ID to determine which output bus or buses to use for a particular lookup operation. Thus, depending on the configuration, a single or multiple output buses/pins can selectively be used to communicate results 240, with this decision possibly being made based on the tradeoff of receiving multiple results simultaneously versus the number of pins required.

Associative memory 200 provides many powerful capabilities for simultaneously producing one or more results 240. For example, in one embodiment, based on a received profile ID, control logic 210 identifies which of the one or more associative memory blocks 218–219 to enable and then enables them, and provides the profile ID to output selectors 231 for selecting a lookup result among the multiple associative memory blocks 218–219. Each of the associative memory blocks 218–219 may receive/identify a modification mapping based on the profile ID, with this modification mapping possibly being unique to itself. This modification mapping can then be used in connection with received modification data to change a portion of a received search key to produce the actual lookup word to be used in the lookup operation. Also, certain entries may be programmed with force no-hit indications to generate a no-hit result for the corresponding associative memory block 218–219 should a corresponding entry be identified as the highest priority entry matching the lookup word. Each of these enabled associative memories 218–219 typically generate a result (e.g., no-hit, hit with highest priority matching entry or location thereof identified) which is typically communicated to each of the output selectors 231–232. Note, in one embodiment, the results are only communicated to the particular output selectors 231–232 which are to consider the particular result in selecting their respective highest priority result received from associative memory blocks 218–219 and possibly other lookup results from previous stage associative memories. Additionally, in certain configurations, multiple associative memories 200 are cascaded or coupled in other methods so that results from one or more stages may depend on previous stage results, such that a lookup can be programmed to be performed across multiple associative memories 200. These and other constructs provided by associative memory 200 and configurations thereof provide powerful programmable lookup search capabilities and result selection mechanisms using one or more stages of associative memories 200, each including N associative memories blocks 218–219 and M output selectors 231–232. In one embodiment, the actual values of N and M may vary among associative memories 200.

Figure 3A:
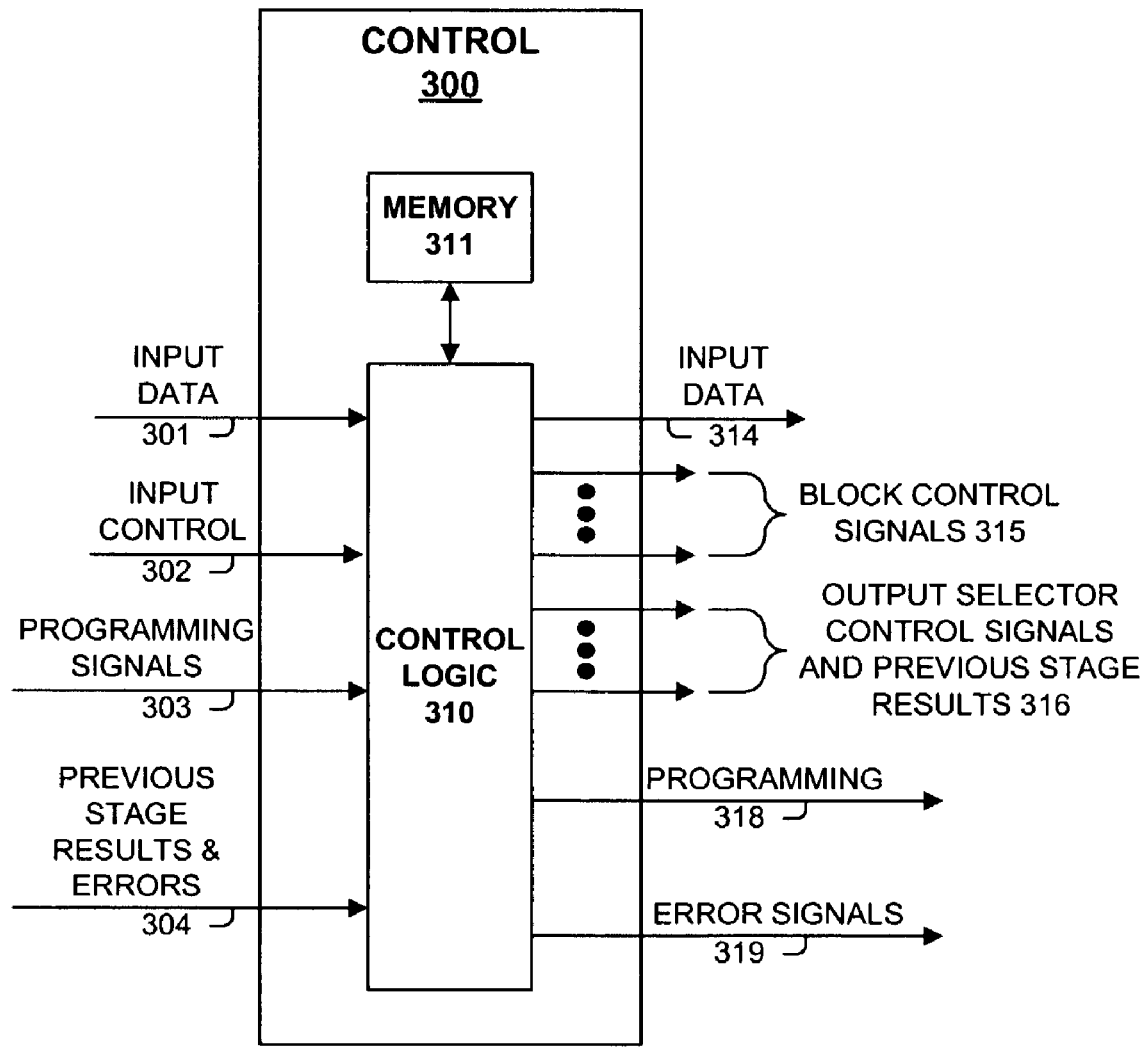
FIGS. 3A–D illustrate various aspects of a control used in one embodiment for performing lookup operations.

FIG. 3A illustrates a control 300 (which may or may not correspond to control logic 210 of FIG. 2) of an associative memory used in one embodiment. As shown, control 300 includes control logic 310 and memory 311. In one embodiment, programming signals 303 are received, and in response, one or more data structures in memory 311 are updated. In addition, control logic generates programming signals 318. In one embodiment, programming 318 is the same as programming signals 303 and thus a physical connection can be used rather than passing through control logic 310. One embodiment of a programming process is illustrated in FIG. 3C, in which processing begins with process block 380. Processing then proceeds to process block 382, wherein programming signals are received. Next, in process block 384, data structures and other elements (e.g., associative memory blocks, output selectors, etc.) are updated. Processing is completed as indicated by process block 386.

Returning to FIG. 3A, in performing a lookup operation, input data 301, input control 302, and optionally previous stage results and errors 304 (such as in a cascaded associative memory configuration) are received by control logic 310. In response, one or more data structures in memory 311 are referenced. Control logic 310 generates input data 314, block control signals 315, output selector control signals and (optionally) previous stage results 316, and possibly an error signal 319 indicating a detected error condition or a received error indicator. In one embodiment, input data 314 is the same as input data 301 and thus a physical connection can be used rather than passing through control logic 310.

Figure 3B:
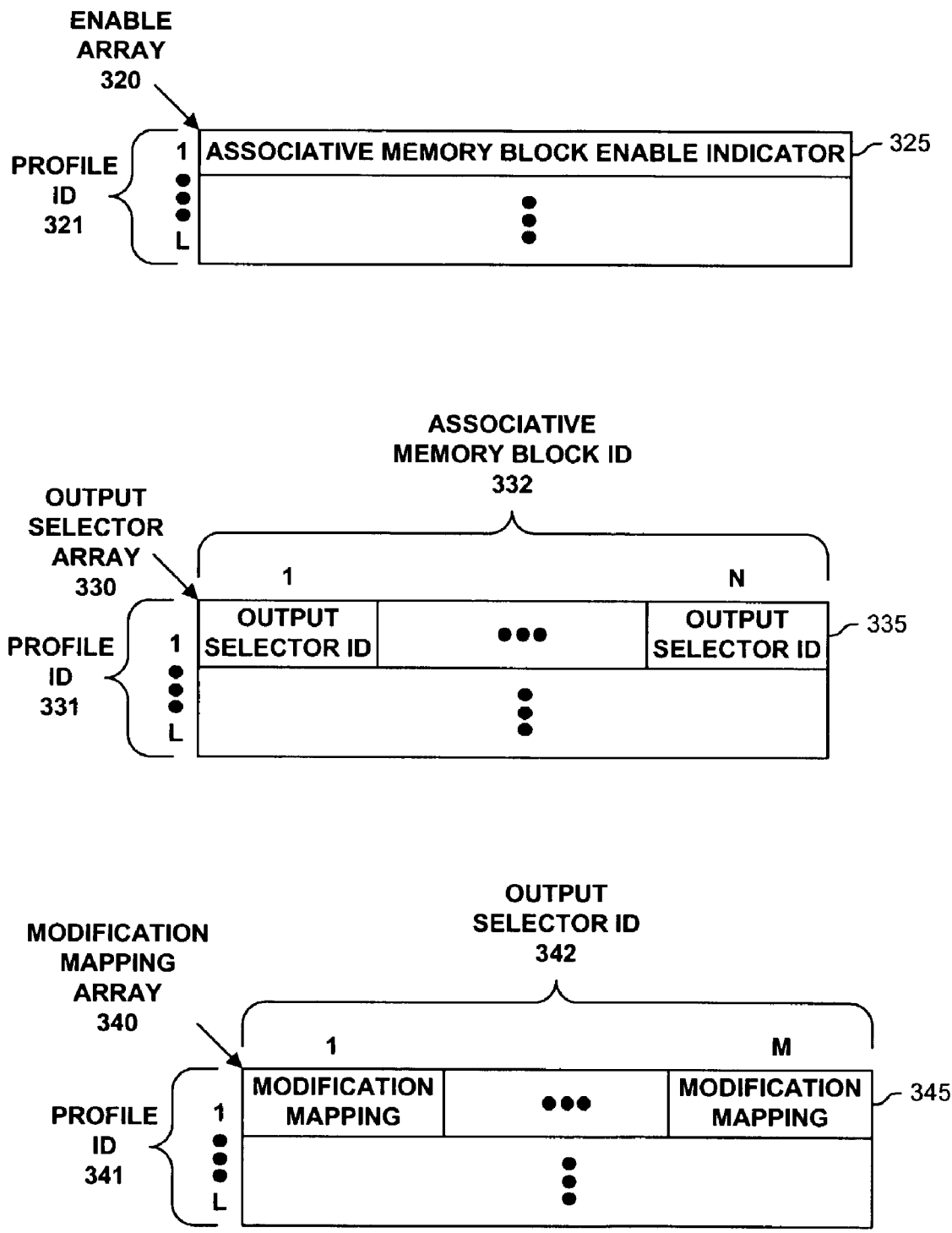
Figure 3C:
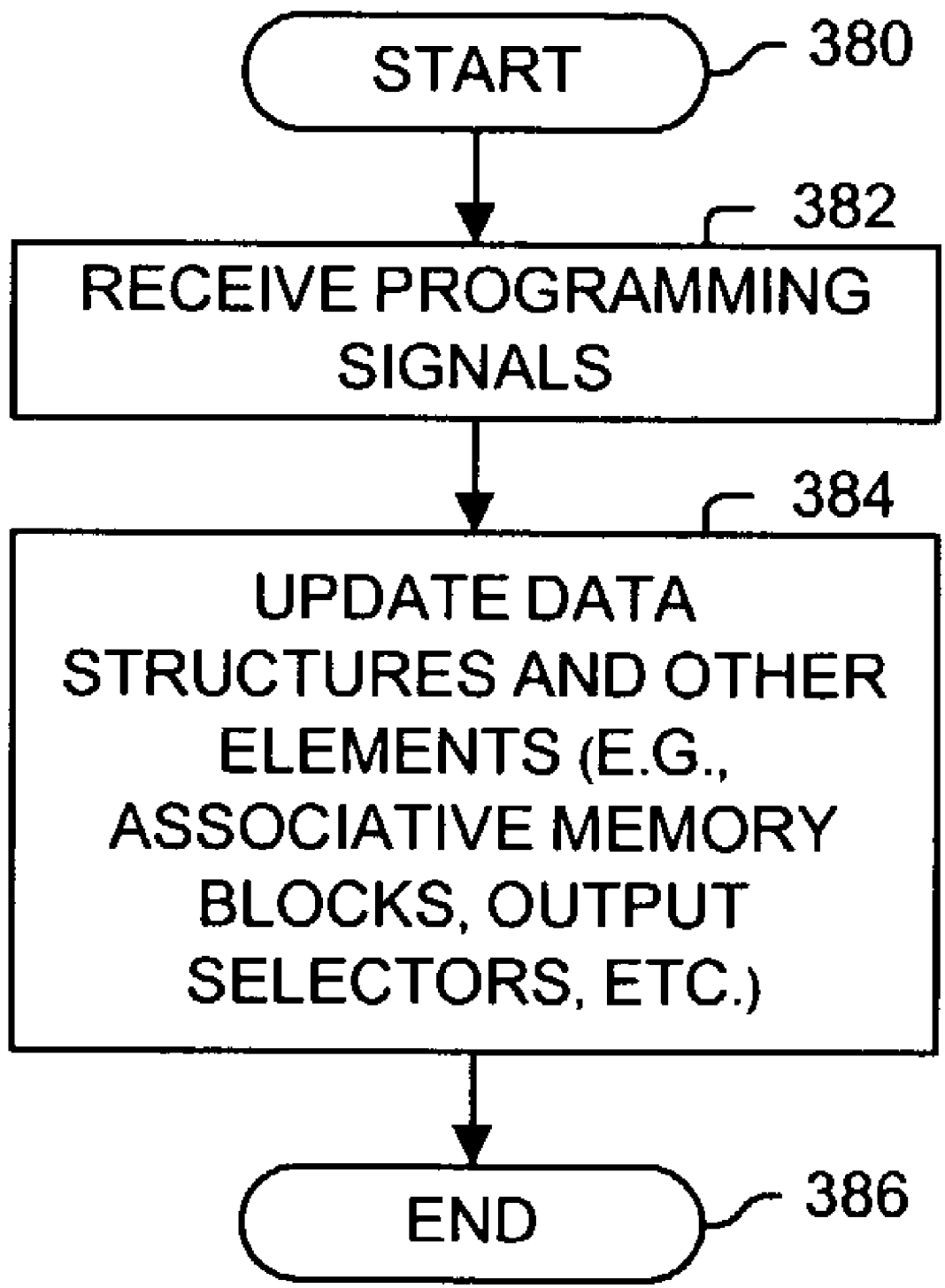

FIG. 3B illustrates one set of data structures used in one embodiment. Enable array 320 is programmed with an associative memory block enable indicator 325 for each profile ID 321 to be used. Each associative memory block enable indicator 325 identifies which associative memory blocks are to be enabled for a given lookup operation. Thus, based on a profile ID 321 received via input control 302 (FIG. 3A), enable array 320 can be retrieved from memory 311 (FIG. 3A), which can then be used to generate associative memory block enable signals included in block control signals 315 (FIG. 3A). In one embodiment, associative memory block enable indicator 325 is a bitmap data structure, while in one embodiment, associative memory block enable indicator 325 is a list, set, array, or any other data structure.

Output selector array 330 is programmed with an output selector ID 335 identifying which output selector, such as, but not limited to output selectors 231–232 (FIG. 2) for each tuple (profile ID 331, associative memory block ID 332). Thus, based on a profile ID 331 received over via input control 302 (FIG. 3A), an output selector ID 335 can be identified for each associative memory block ID 332. In one embodiment, output selector ID 335 is a numeric identifier, while in one embodiment, output selector ID 335 is any value or data structure.

Modification mapping array 340 is programmed with a modification mapping 345 for each tuple (profile ID 341, output selector ID 342). Thus, based on a profile ID 341 received over via input control 302 (FIG. 3A), a modification mapping 345 can be identified for each output selector ID 342. In one embodiment, each modification mapping is a data structure identifying how to modify a received search key with received modification data.

Figure 3D:
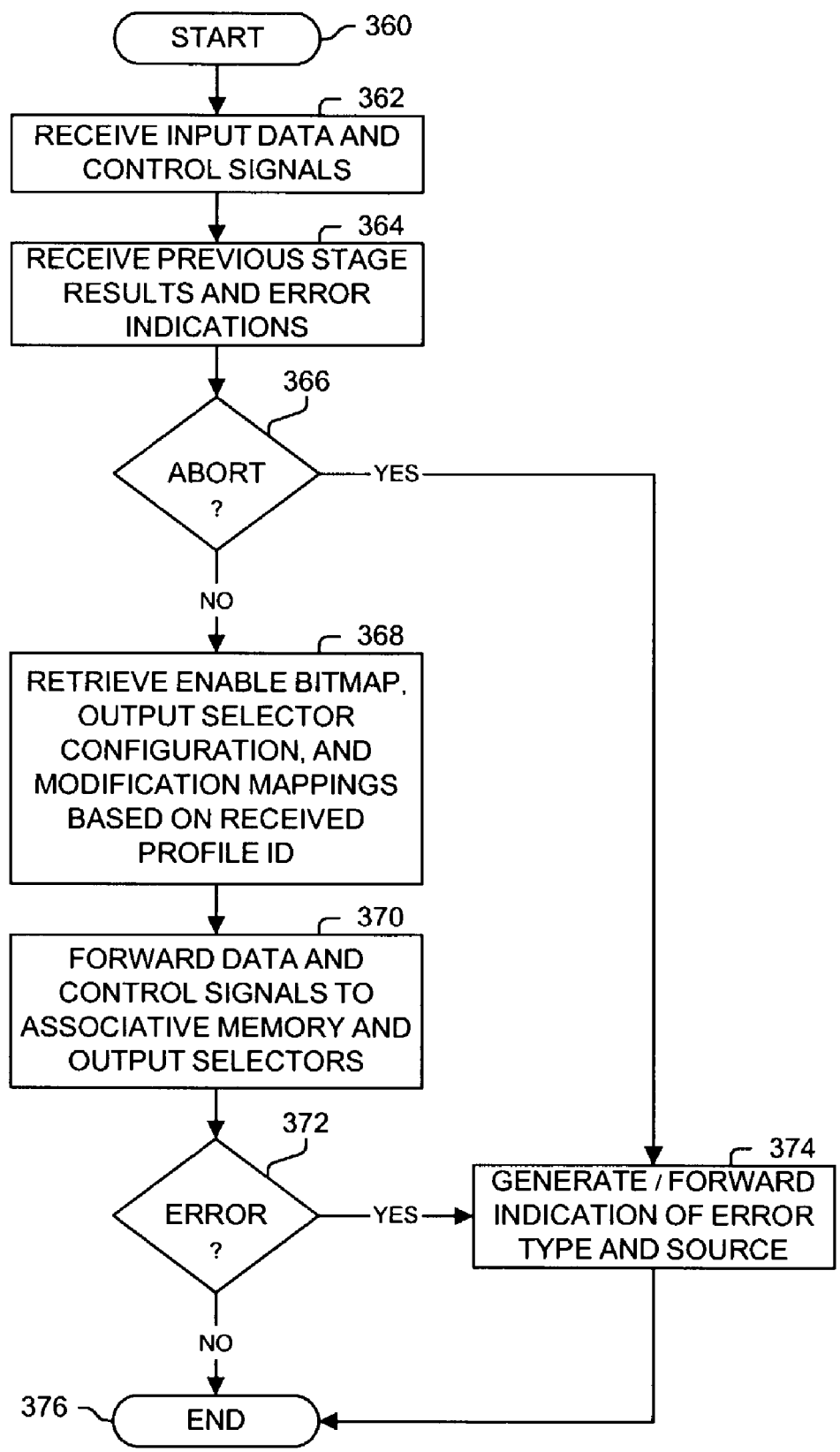

FIG. 3D illustrates a process used in one embodiment for initiating a lookup operation. Processing begins with process block 360, and proceeds to process block 362, wherein input data and control signals are received. Next, in process block 364, any previous stage results and error indications are received. As determined in process block 366, if an abort operation should be performed, such as, but not limited to in response to a received fatal error indication or an identified fatal error condition, then processing proceeds to process block 374 (discussed hereinafter). Otherwise, in process block 368, the enable bitmap, output selector configuration, and modification mappings are received based on the profile ID. Next, in process block 370, data and control signals based on the retrieved and received information are forwarded to the associative memory blocks and output selectors. As determined in process block 372, if an error condition is identified or has been received, then in process block 374, an error indication, typically including an indication of the error type and its source is generated or forwarded. Processing is complete as indicated by process block 376.

Figure 4A:
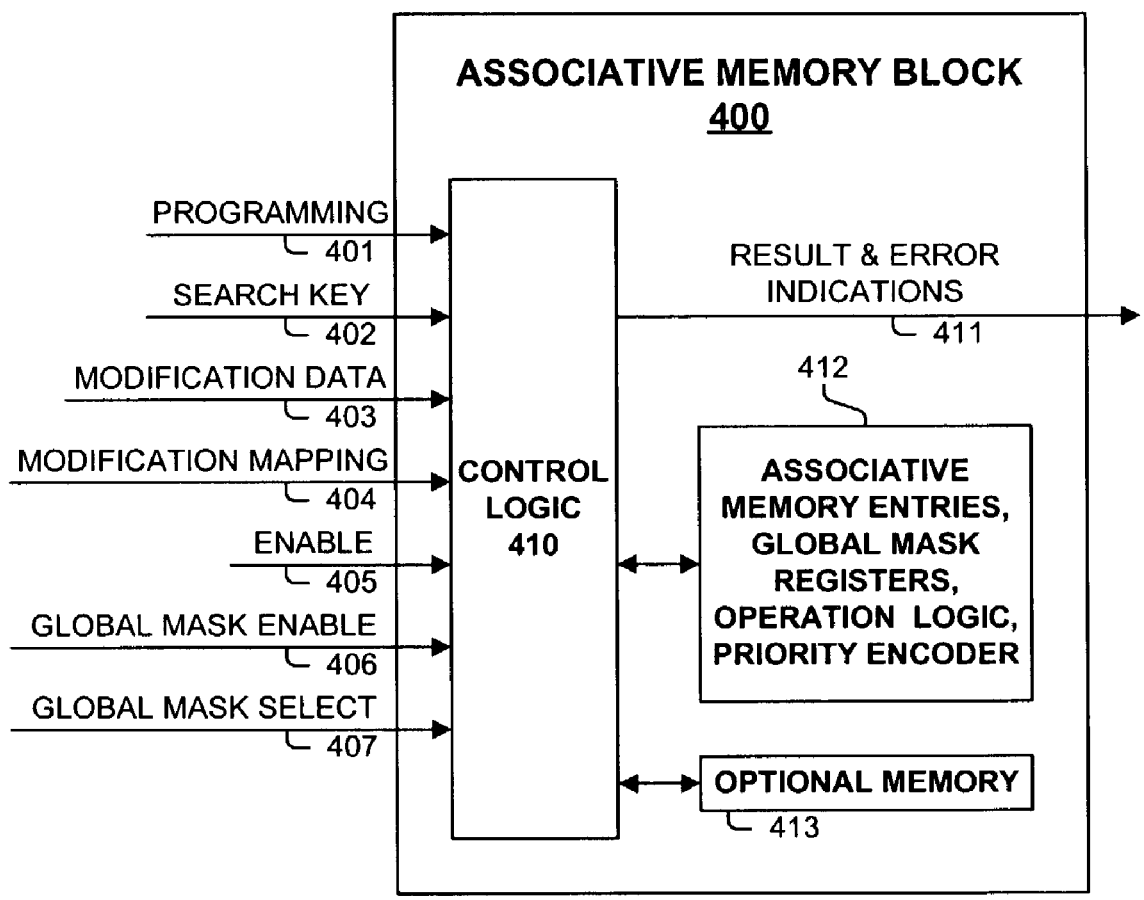
FIGS. 4A–G illustrate various aspects of an associative memory block used in one embodiment for performing lookup operations.

FIG. 4A illustrates an associative memory block 400 used in one embodiment. Associative memory block 400 typically includes control logic 410 and associative memory entries, global mask registers, operation logic and priority encoder 412 (e.g., elements for performing the associative memory match operation on a received lookup word). In one embodiment, sets of associative memory entries are grouped into banks of associative memory entries. In one embodiment, programming signals 401 arc received, and in response, one or more associative memory entries and/or global mask registers in block 412 are updated. In one embodiment, an associative memory block 400 corresponds to a set or bank of associative memory entries and a mechanism for performing a lookup operation on the set or bank of associative memory entries to produce one or more results. In one embodiment, no mask register is included in associative memory block 400.

Moreover, one embodiment of associative memory block 400 includes a memory 413 for storing configuration information, which may allow an associative memory block 400 to retrieve the information from memory 413 rather than receive it from another source. For example, in one embodiment, modification mapping data (e.g., modification mapping 345 of FIG. 3B) or other information is programmed into memory 413. Then, associative memory block 400 retrieves the modification mapping information, such as based on a received profile ID (e.g., rather than receiving the modification mapping signal 404).

Additionally, in one embodiment, a search key 402, modification data 403, modification mapping 404, an enable signal 405, a global mask enable signal 406, and a global mask select signal 407 are received. In response to performing a lookup operation and/or detecting an error condition, such as a parity fault in one of the associative memory entries, result and error indications 411 are generated. In one embodiment, associative memory entries are checked for parity errors in background. The use of these signals and information in one embodiment are further described in relation to FIGS. 4B–4G.

Figure 4B:
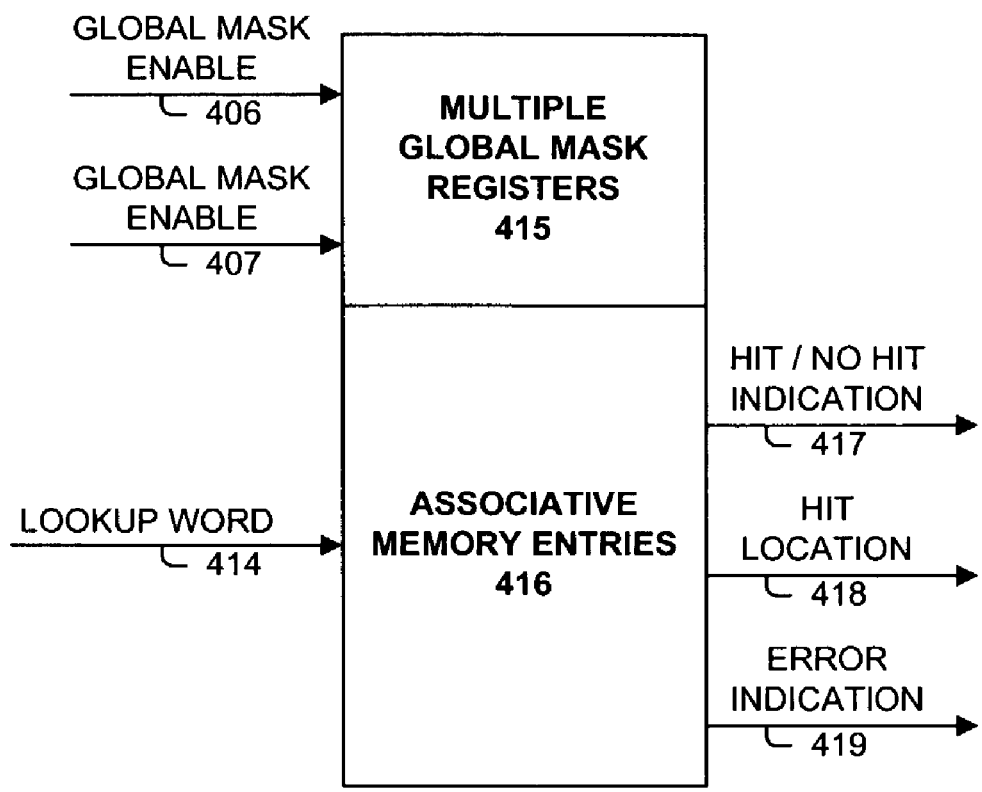

Turning to FIG. 4B, one embodiment includes multiple global mask registers 415 for use in a lookup operation on associative memory entries 416. Global mask enable signal 406 enables the use of a global mask register, while global mask select 407 identifies which of multiple masks to apply to each of the associative memory entries. Lookup word 414 is applied to associative memory entries 416, with possibly using one or more of global masks stored in global mask registers 415, to generate hit/no hit indication 417 and possibly hit location 418 and/or error indication 419, which are incorporated directly or indirectly into result and error indications 411 (FIG. 4A).

Figure 4C:
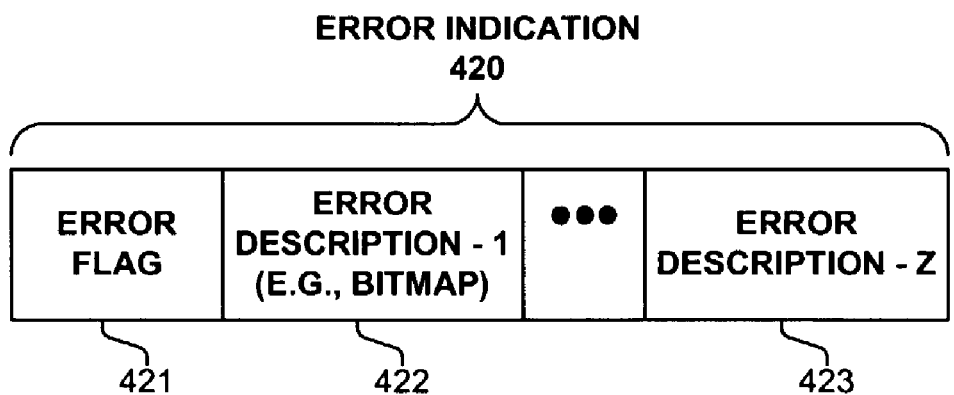

FIG. 4C illustrates an error indication 420 used in one embodiment. As shown, error indication 420 includes an error indication 421 for identifying if any or possibly the number of error indications included therein. For any identified error condition or received error indication, an encoded description of each error is included in one or more of the error descriptors 422–423. In one embodiment, a bitmap is used in one or more of error descriptors 422–423, wherein each bit represents a possible error condition, and the value of the bit indicates whether or not a corresponding error has been identified (including received from a prior component or stage.) In one embodiment, each error descriptor 422–423 corresponds to a different component, interface, or previous stage. In one embodiment, error indication 420 is used by other components in communicating error conditions or lack thereof.

Figure 4D:
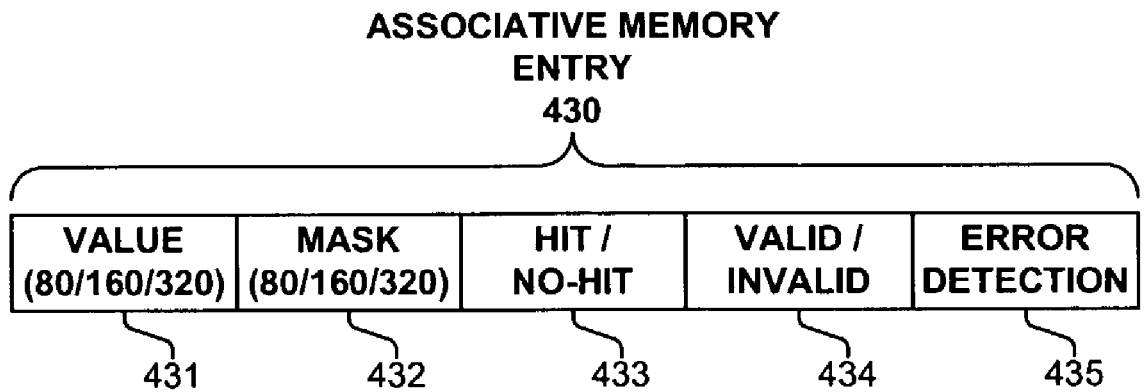

FIG. 4D illustrates an associative memory entry 430 used in one embodiment. As shown, associative memory entry 430 includes a value 431, an optional mask 432, force no hit indication 433, valid/invalid flag 434, and an error detection value 435. Error detection value 435 may be one or more parity bits, a cyclic redundancy checksum value, or a value corresponding to any other mechanism used for detecting data corruption errors. In one embodiment, value 431 is of a configurable width. In one embodiment, this configurable width includes 80 bits, 160 bits and 320 bits. In one embodiment, such as that of a binary content-addressable memory, no mask field 432 is included. In one embodiment, the width of mask field 432 is variable, and typically, although not required, matches the width of value field 431. In one embodiment, fields 431–435 are stored in a single physical memory; while in one embodiment, fields 431–435 are stored in multiple physical memories.

Figure 4E:
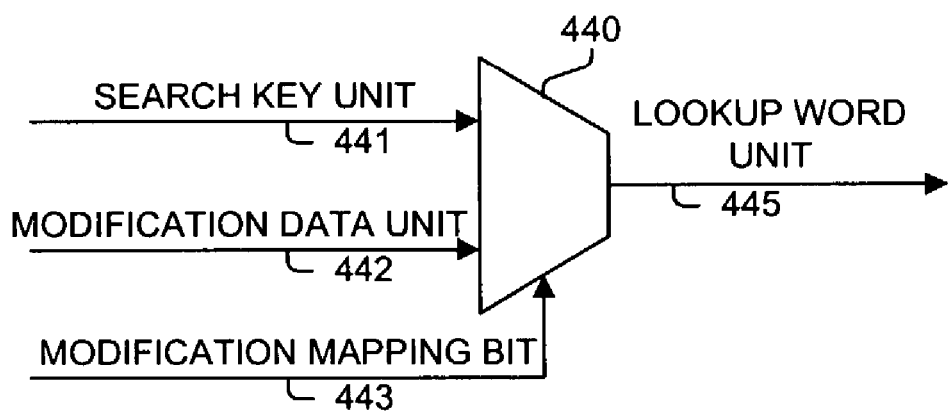

FIG. 4E illustrates a mechanism to modify a search key based on modification mapping and modification information used in one embodiment. As shown, a modification mapping bit 443 is used to control selector 440 which selects either search key unit (e.g., one or more bits, bytes, etc.) 441 or modification data unit 442 as the value for lookup unit 445, which is typically a portion of the actual lookup word to be used in matching associative memory entries in a lookup operation.

Figure 4F:
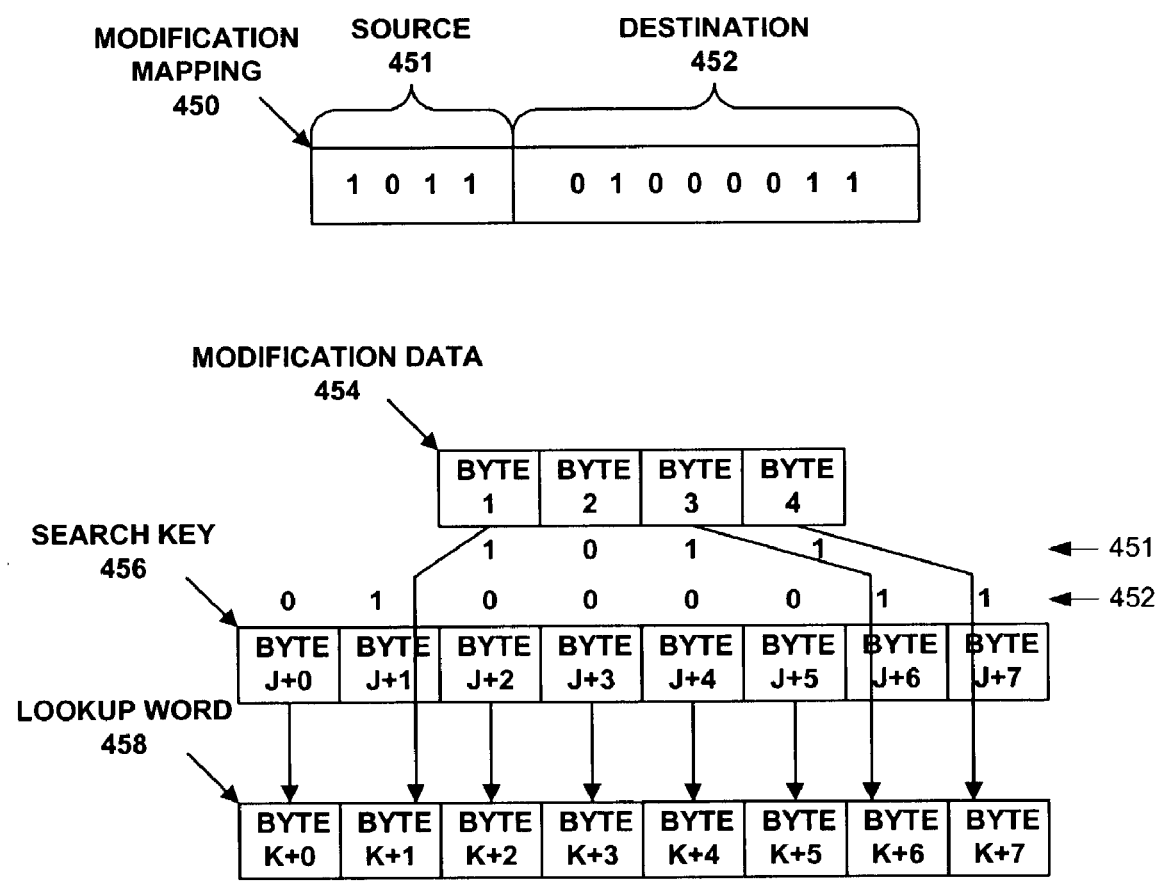

FIG. 4F illustrates a mechanism to modify a search key 456 based on modification mapping 450 and modification data 454 used in one embodiment. In one embodiment, modification mapping 450 corresponds to a modification mapping 345 (FIG. 3B). As shown in FIG. 4F, modification mapping 450 includes a source portion 451 and a destination portion 452. Referring to the lower portion of FIG. 4F, modification data 454 includes four bytes and search key 456 includes eight bytes. The source portion 451 of modification mapping 450 identifies which bytes of modification data 454 are to be used in generating lookup word 458, and the destination portion 452 of modification mapping 450 identifies where the corresponding bytes to be used of modification data 454 are to be placed in lookup word 458, with the remaining bytes coming from search key 456. In other words, modification mapping 450 and modification data 454 are used to replace certain specified data units in search key 456 in producing the value which will be used in matching the associative memory entries. Of course, various embodiments use different numbers of bits and bytes for modification mapping 450 and modification data 454. In one embodiment, modification mapping 450 includes an indication of the portion of search key 456 to modify (e.g., the value of J in one embodiment, the high-order bytes, the low order bytes, etc.).

Figure 4G:
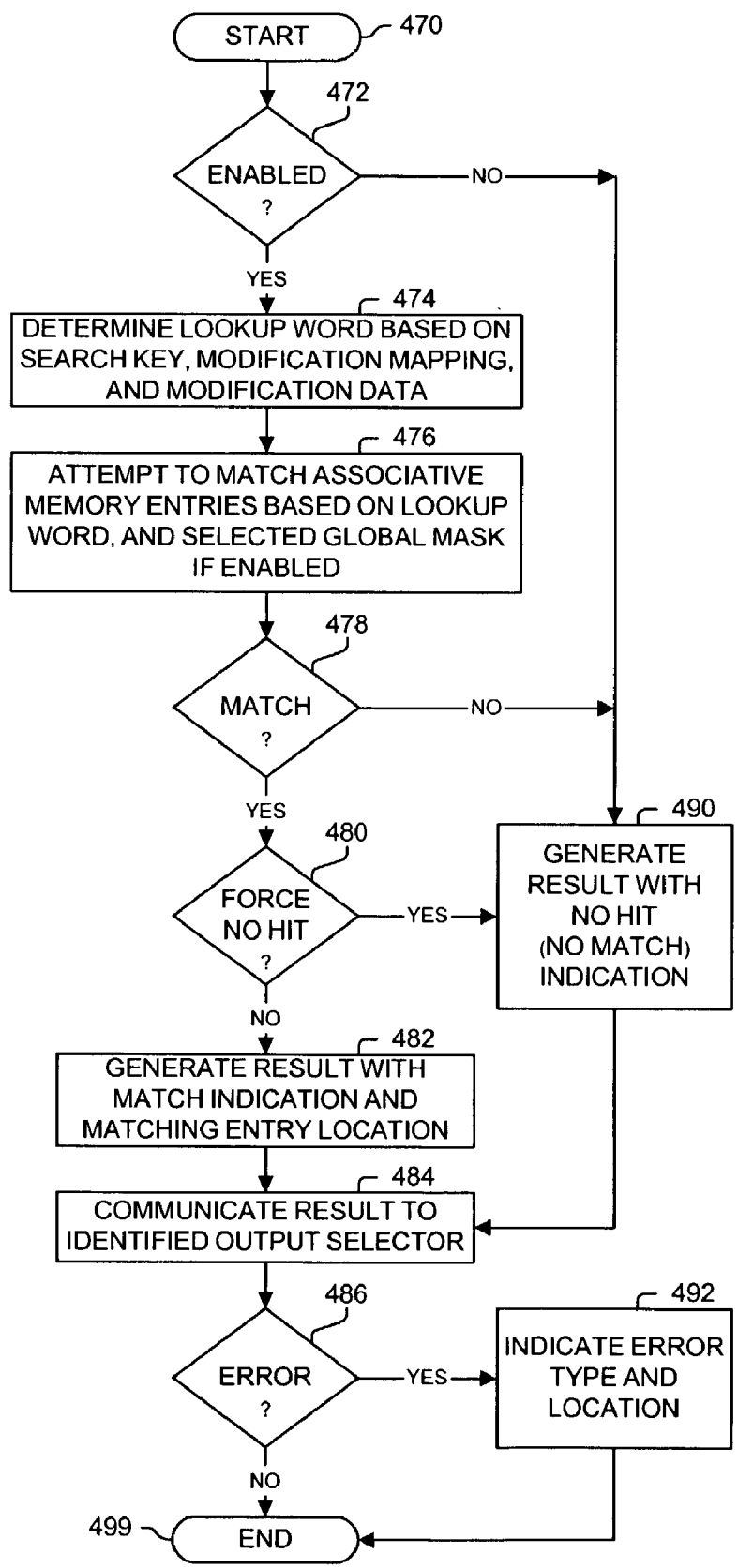

FIG. 4G illustrates an associative memory process used in one embodiment in performing a lookup operation. Processing begins with process block 470, and proceeds to process block 472. If the associative memory is not enabled, then processing proceeds to process block 490 wherein a result with a no hit indication is generated, and processing continues to process block 484. Otherwise, in process block 474, the lookup word is determined typically based on the search key, modification mapping, and modification data. Note, in one embodiment, the search key is used as the lookup word and there is no concept of a modification mapping or modification data. Next, in process block 476, the lookup word is used to match the associative memory entries with consideration of a selected and enabled global mask, if any. Note, in one embodiment, there is no concept of a global mask.

As determined in process block 478, if at least one match has been identified, then processing proceeds to process block 480, otherwise to process block 490, wherein a result with a no hit indication is generated and processing proceeds to process block 484. Otherwise, as determined in process block 480, if the highest priority matching entry includes a force no hit indication, then processing proceeds to process block 490, wherein a result with a no hit indication is generated and processing proceeds to process block 484. Otherwise, in process block 482, a result indicating a hit (i.e., successful match) with the highest priority matching entry identified is generated.

In process block 484, the result is communicated to at least the identified output selector or selectors. In one embodiment, the output selector to which to communicate the result is identified by output selector ID 335 (FIG. 3B). As determined in process block 486, if an error condition has been identified or received, then in process block 492, a signal is generated indicating the type and location of the error. In one embodiment, error indication 420 (FIG. 4C) is used. Processing is complete as indicated by process block 499.

Figure 5A:
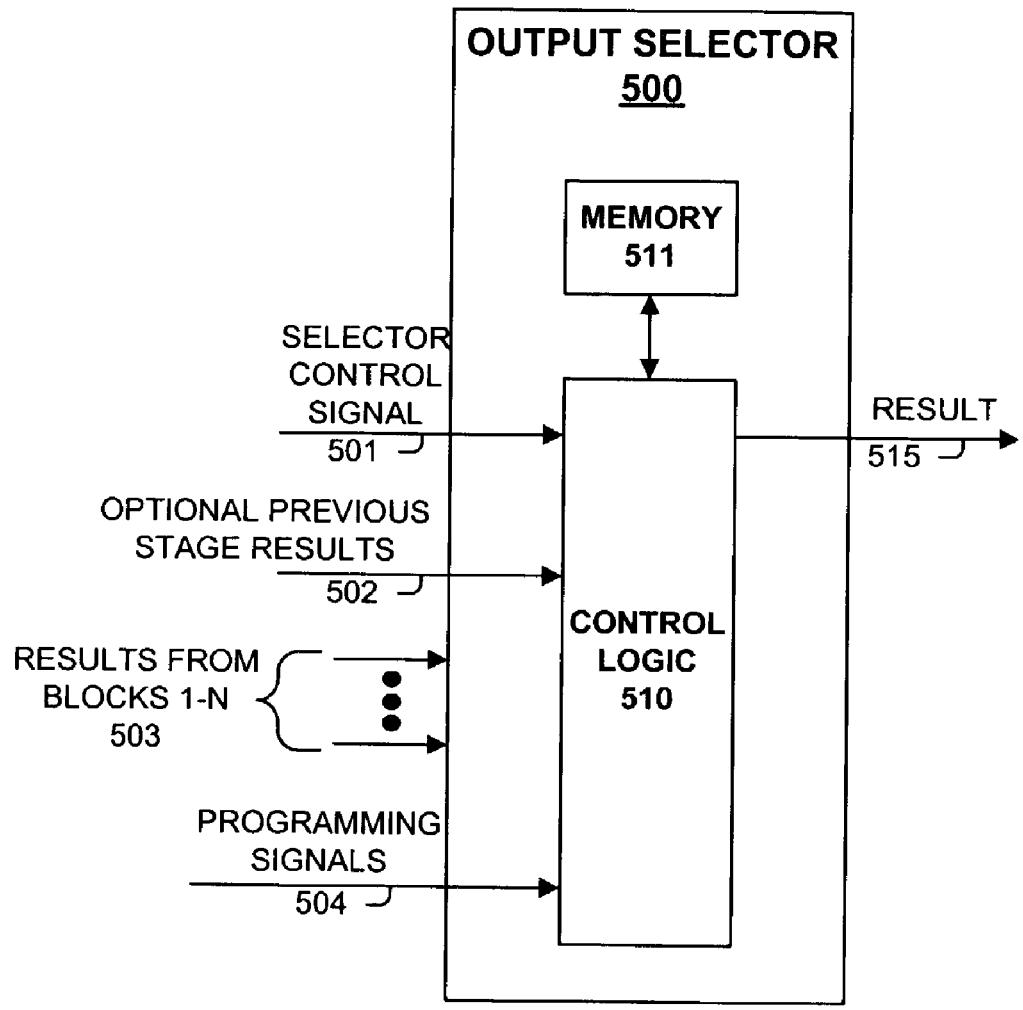
FIGS. 5A–C illustrate various aspects of an output selector used in one embodiment for performing lookup operations.

FIG. 5A illustrates of an output selector 500 (which may or may not correspond to an output selector 231–232 of FIG. 2) used in one embodiment. As shown, output selector 500 includes control logic 510 and memory 511. In one embodiment, programming signals 504 are received, and in response, one or more data structures in memory 511 are updated.

Figure 5B:
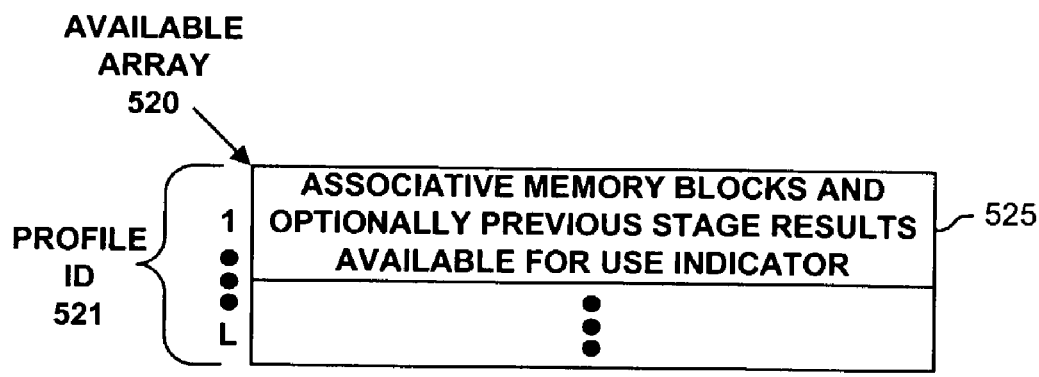

FIG. 5B illustrates one data structure used in one embodiment. Available array 520 is programmed with an associative memory blocks and optionally previous stage results available for use indicator 525 for each profile ID 521 to be used. Each indicator 525 identifies which, if any, associative memory blocks, sets of entries or associative memory banks are to be considered in determining which matching associative entry to select for the ultimate highest-priority matching associative memory entry. In one embodiment, indicator 525 further identifies which previous stage results to consider. Thus, based on a profile ID 521 received over via selector control signal 501 (FIG. 5A), available array 520 can be retrieved from memory 511 (FIG. 5A). In one embodiment, there is an implied priority ordering of associative memory blocks and any previous stage results, while in one embodiment this priority ordering for determining the ultimate highest-priority matching entry is programmable and/or variable per lookup operation. In one embodiment, associative memory blocks available for use indicator 525 is a bitmap data structure, while in one embodiment, associative memory blocks available for use indicator 525 is a list, set, array, or any other data structure.

Returning to FIG. 5A, in the performance of a lookup operation, output selector 500 receives selector control signal 501, which may include a profile ID. In addition, output selector 500 receives any relevant previous stage results 502 and results 503 from zero or more of the associative memory blocks from which the highest-priority entry will be selected, and which, if any, will be identified in generated result 515.

Moreover, in one embodiment, selector control signal 501 including an enable indication, the enable indication including an enabled or not enabled value, such that in when a not enable value is received, output selector 500 is not enabled and does not select among results from blocks 1–N 503 or optional previous stage results 502. In one embodiment, when not enabled, output selector 500 generates a result signal 515 indicting a no hit, not enabled, or some other predetermined or floating value.

Additionally, in one embodiment, result 515 is communicated over a fixed output bus, which may or may not be multiplexed with other results 515 generated by other output selectors 500. In one embodiment, the associative memory may include one or more output buses, each typically connected to a single pin of a chip of the associative memory, with the selection of a particular output bus possibly being hardwired or configurable, with the configuration possibly being on a per lookup basis, such as that determined from a received value or configuration information retrieved from a memory (e.g., based on the current profile ID.) In such a configuration, control logic 510 (or other mechanism) typically selects which output bus (and the timing of sending result 515) to use for a particular or all results 515.

Figure 5C:
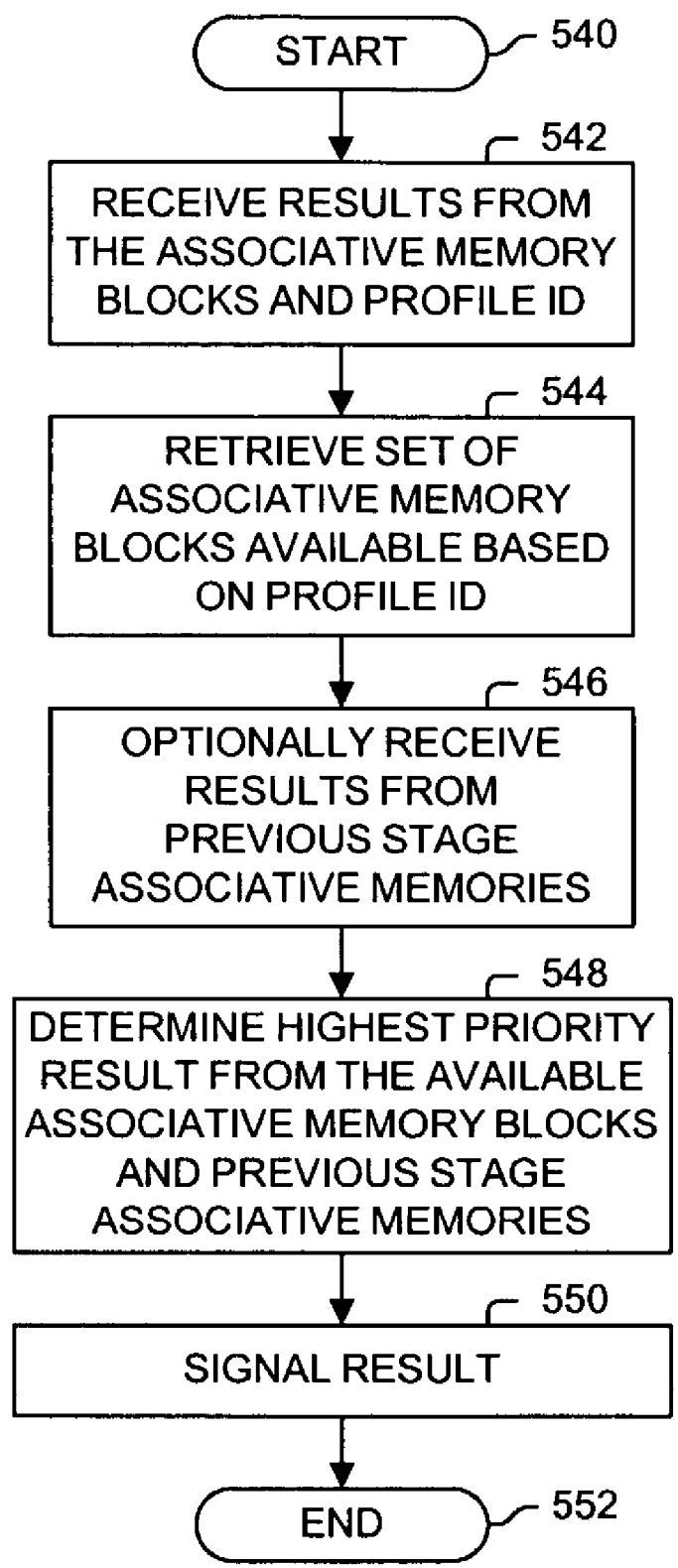

A process used in one embodiment for receiving and selecting a highest-priority associative memory entry, if any, is illustrated in FIG. 5C. Processing begins with process block 540, and proceeds to process block 542, wherein the results from the associative memory blocks and the profile ID are received. In process block 544, the set of associative memory blocks to consider in determining the result is retrieved from a data structure/memory based on the profile ID. In process block 546, any relevant previous stage results are received from coupled associative memories. Next, in process block 548, the highest priority match from the available associative memory block and previous stage results is identified, if any. Then, in process block 550, the result is communicated over a fixed or identified output bus/pin or to some other destination, with the result typically including a no hit indication or a hit indication and an identification of the ultimate highest-priority matching associative memory entry. Processing is complete as indicated by process block 552.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed by an associative memory for generating a lookup result in the associative memory, the associative memory including a plurality of associative memory blocks, the method comprising:
   receiving a profile ID;
   retrieving an indication of a subset of the plurality of associative memory blocks to use in determining the lookup result from a memory based on the profile ID, each of the subset of the plurality of associative memory blocks indicating an associative memory block lookup result;
   selecting a highest priority hit result from said associative memory block lookup results from the subset of the plurality of associative memory blocks; and
   indicating the highest priority hit result as the lookup result.

2. The method of claim 1, further comprising identifying, based on the profile ID, which of the plurality of associative memory blocks to enable in generating the lookup result.

3. The method of claim 1, wherein each of the plurality of associative memory blocks includes one or more associative memory banks, each of said one or more associative memory banks including a plurality of associative memory entries.

4. The method of claim 1, wherein each of the plurality of associative memory blocks includes a plurality of associative memory entries.

5. The method of claim 1, comprising selecting a particular one of a plurality of output buses, wherein said indicating includes indicating the lookup result on a particular one of the plurality of output buses.

6. The method of claim 5, comprising receiving an indication of the particular one of the output buses; wherein said selecting is performed based on the indication.

7. The method of claim 5, comprising retrieving from a memory an indication of the particular one of the output buses; wherein said selecting the particular one of the plurality of output buses is performed based on the indication of the particular one of the output buses.

8. The method of claim 7, wherein said retrieving from the memory the indication of the particular one of the output buses is performed based on the profile ID.

9. The method of claim 5, wherein each of the plurality of output buses is configured to communicate the selected lookup result to a different set of one or more pins of an associative memory.

10. An associative memory device comprising:
    a plurality of associative memory blocks, each of the associative memory blocks indicating an associative memory block lookup result; and
    an output selector configured to retrieve from a memory an indication of the plurality of associative memory blocks to consider in producing an overall lookup result, and to select among said plurality of associative memory block lookup results based on the indication of the plurality of associative memory blocks to consider in producing the overall lookup result;
    wherein the associative memory device is configured to receive a profile ID; and wherein the output selector is configured to retrieve the indication of the plurality of associative memory blocks to consider from the memory based on the profile ID.

11. The associative memory device of claim 10, wherein the associative memory device is configured to receive one or more previous stage results; and wherein the output selector is configured to further select among said one or more previous stage results in addition to the plurality of associative memory blocks in producing the overall lookup result.

12. The associative memory device of claim 11, wherein the indication further indicates which of said one or more previous stage results to select among in producing the overall lookup result.

13. The associative memory device of claim 10, wherein the associative memory device is configured to receive one or more previous stage error signals indicating one or more previous stage error conditions, and to generate an error signal including said one or more previous stage error conditions.

14. The associative memory device of claim 13, further configured to identify one or more internal or communications error conditions, and wherein said error signal further identifies said one or more internal or communications error conditions.

15. The associative memory device of claim 10, comprising means to identify an enabled subset of the plurality of associative memory blocks to enable for performing a particular lookup operation; and means to communicate an enable indication to the enabled subset of the plurality of associative memory blocks.

16. The associative memory device of claim 10, wherein each of the plurality of associative memory blocks includes one or more associative memory banks, each of said one or more associative memory banks including a plurality of associative memory entries.

17. The associative memory device of claim 10, wherein each of the plurality of associative memory blocks includes a plurality of associative memory entries.

18. An apparatus for performing lookup operations, the apparatus comprising:
 a first associative memory configured to receive a lookup request and to perform a lookup operation to generate a first set of results, the first associative memory including means for identifying a first set of error conditions and means for relaying indications of the first set of results and one or more indications of the first set of error conditions to a second associative memory; and
 the second associative memory, coupled to the first associative memory, configured to receive said indications of the first set of results and said indications of the first set of error conditions, the second associative memory including means for forwarding said one or more indications of the first set of error conditions to a next device.

19. The apparatus of claim 18, wherein the next device includes a third associative memory.

20. The apparatus of claim 18, wherein the first associative memory includes a plurality of associative memory entries, and the first set of error conditions includes a parity error in at least one of the plurality of associative memory entries.

21. The apparatus of claim 18, wherein the first set of error conditions includes a communication error.

22. The apparatus of claim 18, wherein the first set of error conditions includes detection of invalid control information.

23. An associative memory for generating a lookup result, the associative memory including a plurality of associative memory blocks, the associative memory comprising:
 means for retrieving an indication of a subset of the plurality of associative memory blocks to use in determining the lookup result, each of the subset of the plurality of associative memory blocks indicating an associative memory block lookup result;
 means for selecting a highest priority hit result from said associative memory block lookup results from the subset of the plurality of associative memory blocks; and
 means for indicating the highest priority hit result as the lookup result; and means for identifying and reacting to an abort condition.

24. The associative memory of claim 23, wherein each of the plurality of associative memory blocks includes one or more associative memory banks, each of said one or more associative memory banks including a plurality of associative memory entries.

25. The associative memory of claim 23, wherein each of the plurality of associative memory blocks includes a plurality of associative memory entries.

26. The associative memory of claim 23, comprising means for communicating a means for indicating one or more error conditions to another device or component.

27. An associative memory for generating a lookup result, the associative memory including a plurality of associative memory blocks, the associative memory comprising:
 means for receiving a profile ID;
 means for identifying, based on the profile ID an indication of a subset of the plurality of associative memory blocks to use in determining the lookup result, each of the subset of the plurality of associative memory blocks indicating an associative memory block lookup result;
 means for selecting a highest priority hit result from said associative memory block lookup results from the subset of the plurality of associative memory blocks; and means for indicating the highest priority hit result as the lookup result.

28. The associative memory of claim 27, further comprising means for identifying, based on the profile ID, which of the plurality of associative memory blocks to enable in generating the lookup result.

29. An associative memory for generating a lookup result, the associative memory including a plurality of associative memory blocks, the associative memory comprising:
 means for retrieving an indication of a subset of the plurality of associative memory blocks to use in determining the lookup result, each of the subset of the plurality of associative memory blocks indicating an associative memory block lookup result;
 means for selecting a highest priority hit result from said associative memory block lookup results from the subset of the plurality of associative memory blocks;
 means for indicating the highest priority hit result as the lookup result; and
 means for receiving and reacting to one or more error signals from one or more previous stage results.

30. The associative memory of claim 29, comprising means for identifying and reacting to an abort condition.

31. An apparatus for performing lookup operations and to simultaneously produce one or more lookup results, the apparatus comprising:
 a plurality of associative memory blocks, each of the associative memory blocks indicating an associative memory block lookup result; and
 a plurality of output selectors, each of the plurality of output selectors are coupled to each of the plurality of associative memory blocks and configured to retrieve from a memory an indication of the plurality of associative memory blocks to select among in producing a selected lookup result, and configured to select among said plurality of associative memory block lookup results based on the indication of the plurality of associative memory blocks to select among in producing the selected lookup result.

32. The apparatus of claim 31, wherein each of the plurality of output selectors is configured to receive one or more previous stage results and to further select among said one or more previous stage results in addition to the plurality of associative memory blocks in producing the selected lookup result.

33. The apparatus of claim 31, comprising means for receiving a profile ID and means for communicating the profile ID to each of the plurality of output selectors; and wherein each of the plurality of output selectors is configured to retrieve the indication of the plurality of associative memory blocks to select among from the memory based on the profile ID.

34. The apparatus of claim 31, wherein the indication corresponding to a particular one of the plurality output selectors indicates to select none of the plurality of associative memory blocks.

35. The apparatus of claim 31, wherein each of the plurality of output selectors is configured to receive a corresponding enable indication, the enable indication including an enabled or not enabled value, wherein each of the plurality of output selectors is configured not to select among the plurality of associative memory blocks when its said corresponding enable indication includes said not enabled value.

36. The apparatus of claim 31, comprising a plurality of output buses, wherein each of the plurality of output selectors is configured to select a particular output bus of the plurality of output buses, and to signal the selected lookup result over the particular output bus.

37. The apparatus of claim 36, comprising means for receiving a profile ID and means for communicating the profile ID to each of the plurality of output selectors; wherein each of the plurality of output selectors is configured to retrieve from the memory an indication of the particular output bus.

38. The apparatus of claim 37, wherein the particular output buses selected by at least two of the plurality of output selectors are different output buses of the plurality of output buses.

* * * * *

UNITED STATES PATENT AND TRADEMARK OFFICE
CERTIFICATE OF CORRECTION

PATENT NO. : 7,065,609 B2  Page 1 of 1
APPLICATION NO. : 10/215700
DATED : June 20, 2006
INVENTOR(S) : Eatherton et al.

It is certified that error appears in the above-identified patent and that said Letters Patent is hereby corrected as shown below:

On the title page item (56), page 2, insert reference -- Moors et al., June 1992, IEEE Micro, Vol. 12, pages 56-66 --

Col. 18, line 6, delete "and"

Col. 18, line 8, insert line break between "and" and "means"

Col. 18, line 25, replace "ID an" with -- ID, an --

Signed and Sealed this

Twenty-eighth Day of November, 2006

JON W. DUDAS
*Director of the United States Patent and Trademark Office*